(12) United States Patent
Yu et al.

(10) Patent No.: US 9,479,252 B2
(45) Date of Patent: Oct. 25, 2016

(54) PRE-EQUALIZATION USING PHASE CORRECTION

(71) Applicant: ZTE Corporation, Shenzhen (CN)

(72) Inventors: Jianjun Yu, Basking Ridge, NJ (US); Ze Dong, Morristown, NJ (US)

(73) Assignee: ZTE Corporation, Shenzhen (CN)

( * ) Notice: Subject to any disclaimer, the term of this patent is extended or adjusted under 35 U.S.C. 154(b) by 0 days.

(21) Appl. No.: 14/274,669

(22) Filed: May 9, 2014

(65) Prior Publication Data

US 2014/0334828 A1   Nov. 13, 2014

Related U.S. Application Data

(60) Provisional application No. 61/821,645, filed on May 9, 2013.

(51) Int. Cl.
*H04B 10/2507* (2013.01)
*H04B 10/516* (2013.01)
*H04B 10/073* (2013.01)
*H04B 10/63* (2013.01)

(52) U.S. Cl.
CPC ........ *H04B 10/2507* (2013.01); *H04B 10/073* (2013.01); *H04B 10/516* (2013.01); *H04B 10/63* (2013.01)

(58) Field of Classification Search
CPC ........ H04B 10/073–10/0731; H04B 10/0775; H04B 10/0795; H04B 10/58–10/588; H04B 10/2507–10/25073; H04B 10/2513; H04B 10/2531; H04B 10/5057–10/50577; H04B 2210/25; H04B 2210/254
See application file for complete search history.

(56) References Cited

U.S. PATENT DOCUMENTS

| | | | | |
|---|---|---|---|---|
| 6,426,822 B1* | 7/2002 | Winter | ......... | H04B 10/505 359/245 |
| 7,680,420 B1* | 3/2010 | Walker | ......... | H04B 10/25137 398/183 |
| 8,311,417 B1* | 11/2012 | Poggiolini | ......... | H04B 10/611 398/147 |
| 2009/0196602 A1* | 8/2009 | Saunders | ......... | H04B 10/5053 398/26 |
| 2009/0214201 A1* | 8/2009 | Oda et al. | ......... | 398/25 |
| 2010/0272446 A1* | 10/2010 | Harley et al. | ......... | 398/184 |
| 2010/0272447 A1* | 10/2010 | Kolze | ......... | H04B 10/25751 398/192 |
| 2010/0329694 A1* | 12/2010 | Frankel | ......... | H04B 10/58 398/159 |

(Continued)

OTHER PUBLICATIONS

Cigliutti, R., et al., "Ultra-Long-Haul Transmission of 16×112 Gb/s Spectrally-Engineered DAC-Generated Nyquist-WDM PM-16QAM Channels with 1.05x(Symbol-Rate) Frequency Spacing," Optical Fiber Communication Conference and Exposition and the National Fiber Optic Engineers Conference (OFC/NFOEC '12), Paper OTh3A.3, pp. 1-3, Los Angeles, California, U.S.A., Mar. 2012.

(Continued)

*Primary Examiner* — David Payne
*Assistant Examiner* — Casey Kretzer
(74) *Attorney, Agent, or Firm* — Perkins Coie LLP

(57) ABSTRACT

An optical transmitter determines the transfer function in the reference-based pre-equalization for applying to an optically modulated signal at the transmitter. The determined pre-equalization transfer function is made robust to linewidth inaccuracy of the optical source by performing phase correction during the calculation of the pre-equalization transfer function. The phase correction includes averaging a number of consecutive received phase samples. The determined pre-equalization transfer function is applied to modulated signals prior to the transmission over an optical medium.

16 Claims, 10 Drawing Sheets

(56) References Cited

U.S. PATENT DOCUMENTS

2011/0299849 A1* 12/2011 Klotz et al. .................. 398/26
2012/0155890 A1* 6/2012 Zhou et al. .................. 398/208

OTHER PUBLICATIONS

Dong, Z., et al., "6×128-Gb/s Nyquist-WDM PDM-16QAM Generation and Transmission Over 1200-km SMF-28 With SE of 7.47 b/s/Hz," Journal of Lightwave Technology, 30(24):4000-4005, Dec. 2012.

Dong, Z., et al., "6×144-Gb/s Nyquist-WDM PDM-64QAM Generation and Transmission on a 12-GHz WDM Grid Equipped With Nyquist-Band Pre-Equalization," Journal of Lightwave Technology, 30(23):3687-3692, Dec. 2012.

Jiang, Y., et al., "Pre-compensation for the Effects of Cascaded Optical Filtering on 10 Gsymbol/s DPSK and DQPSK Signals," 35th European Conference on Optical Communication (ECOC '09), Paper P4.14, pp. 1-2, Vienna, Austria, Sep. 2009.

Li, J., et al., "Approaching Nyquist Limit in WDM Systems by Low-Complexity Receiver-Side Duobinary Shaping," Journal of Lightwave Technology, 30(11):1664-1676, Jun. 2012.

Sugihara, T., et al., "43 Gb/s DQPSK Pre-equalization employing 6-bit, 43GS/s DAC Integrated LSI for Cascaded ROADM Filtering," Conference on Optical Fiber Communication (OFC), collocated National Fiber Optic Engineers Conference (OFC/NFOEC '10), Paper PDPB6, pp. 1-3, San Diego, California, U.S.A., Mar. 2010.

Wang, J., et al., "Generation of Spectrally Efficient Nyquist-WDM QPSK Signals Using Digital FIR or FDE Filters at Transmitters," Journal of Lightwave Technology, 30(23):3679-3686, Dec. 2012.

Zhou, X., et al., "Multi-Level, Multi-Dimensional Coding for High-Speed and High-Spectral-Efficiency Optical Transmission," Journal of Lightwave Technology, 27(16):3641-3653, Aug. 2009.

* cited by examiner

PRE-EQUALIZATION USING PHASE CORRECTION

CROSS REFERENCE TO RELATED APPLICATIONS

This patent document claims the benefit of priority of U.S. Provisional Patent Application No. 61/821,645, filed on May 9, 2013. The entire content of the before-mentioned application is incorporated by reference herein.

BACKGROUND

This patent document relates to digital communication, and, in one aspect, relates to optical communication transmitters.

There is an ever-growing demand for data communication in application areas such as wireless communication, fiber optic communication and so on. The demand on core networks is especially higher because not only are user devices such as smartphones and computers using more and more bandwidth due to multimedia applications, but also the total number of devices for which data is carried over core networks is increasing.

Improvements to digital communication reception techniques to further increase the system spectral efficiency are desirable.

SUMMARY

In some disclosed embodiments, a phase correction technique is used at an optical transmitter to compute a transfer function used in the pre-equalization to compensate the aggressive pre-filtering effect for high spectral efficient. Using the phase-corrected pre-equalization transfer functions in the transmit chain, in one aspect, improves the signal to noise ratio performance of an optical communication system.

In some example embodiments, methods, apparatus and a computer program product for storing instructions for determining a pre-equalization transfer function for applying to an optically modulated signal at the transmitter by modulating an optical source by a reference signal using a first modulation scheme to generate a modulated signal, performing digital-to-analog conversion on the modulated signal to generate an analog signal, digitizing the analog signal to generate a received estimate of the modulated signal, phase correcting the estimate of the modulated signal to generate an estimate of the reference signal, and computing the pre-equalization transfer function using the reference signal and the estimated reference signal.

In an example embodiment, a system for optical communication includes an optical signal transmitter configured to transmit a modulated optical signal that is pre-equalized using a transfer function calculated based on a phase averaged estimation and an optical signal receiver configured to receive and decode the modulated optical signal.

DETAILED DESCRIPTION

For the reference-based digital pre-equalization by self-homodyne detection, a light source, such as a laser, is often used to carry communication signals. To meet the calibration of the transfer function measurement that is used for pre-equalization, the requirement for some criteria such as the linewidth of the laser source is very essential. In our previous work, present optical transmission equipment typically uses expensive laser sources that have line-width (e.g., effective output optical spectrum occupancy) as low as 400 Hz for self-homodyne. For example, Orbits Lightwave, Inc. makes a 400 Hz linewidth laser product called Ethernal Laser. To achieve acceptable performance using such lasers therefore requires expensive equipment that has to be maintained and operated carefully.

Less expensive laser sources, such as a 100 KHz linewidth laser from, Emcore (TTX 199475900N00), can significantly reduce capital and operational expenses and be used in many optical communication systems, but currently cannot be used the self-homodyne digital pre-equalization systems because the coarseness of linewidth precludes achieving satisfactory transmission performance.

The present document discloses, among other techniques, the use of a phase correction technique used in the transfer function calculation can be used to pre-equalize transmitter output, even when the optical signal source has relaxed linewidth specification (e.g., 100 kHz instead of 400 Hz). In the experiment illustration, the pre-equalized signals are shown to achieve significant (about 4 dB) optical signal to noise ratio (OSNR) performance improvement in the optical communication system that a 16-Gbaud PDM-QPSK passing through 10 GHz aggressive pre-filtering. These, and other, techniques are further disclosed below.

Figure 1A:
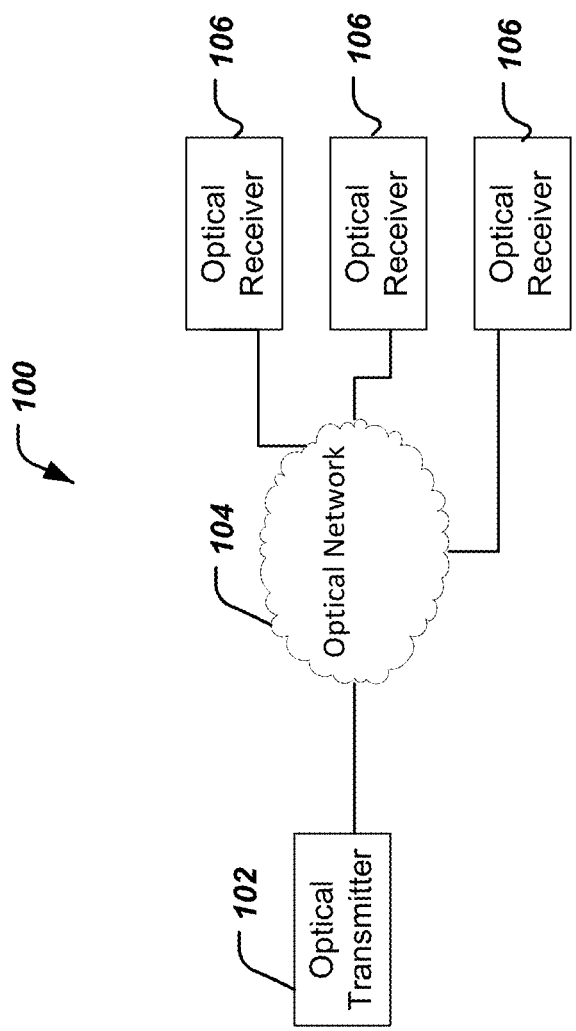
FIG. 1A depicts a block diagram representation of an example of an optical communication system.

FIG. 1A is a block diagram representation of an optical communication system 100 where the subject technology of this document can be implemented. An optical transmitter 102 transmits optical signals through an optical network 104 to one or more optical transceivers 106. The transmitted optical signals may go through intermediate optical equipment such as amplifiers, repeaters, switch, etc., which are not shown in FIG. 1A for clarity.

With the commercial use of the high-speed digital-to-analog converter (DAC), digital pre-equalization at the transmitter to compensate the inter-symbol interference (ISI) caused by aggressive optical pre-filtering has received industry attention. In some embodiments, a reference-based digital pre-equalization via DAC can be implemented at the transmitter by taking into consideration the aggressive optical pre-filtering effect. Such approach utilizes an estimated inverse transfer function (TF) to pre-equalize the transmitted signal in frequency domain to mitigate the ISI induced by pre-filtering. To accurately estimate the TF, the laser source linewidth as narrow as 400 Hz is required to avoid significant phase noise distortion in the transmitted binary phase shift keying (BPSK) signal.

The present document discloses, e.g., an acceptable laser line-width in a reference-based digital pre-equalization in self-homodyne coherent detection systems. A phase correction algorithm that employs reference noise averaging is disclosed and experimentally demonstrated for the reduction of phase noise, enabling the use of low-cost lasers for digital pre-equalization.

In some disclosed embodiments, a phase correction algorithm (PCA) for digital self-homodyne pre-equalization, which enables fine TF estimation with low-cost lasers (linewidth around 100 kHz) by phase noise averaging are possible.

Instead of performing compensation by a digital signal processor (DSP) at the receiver, the pre-equalization process implemented at the transmitter can mitigate narrow-band optical pre-filtering impact. A reference signal, e.g., binary phase shift keying (BPSK) signal may be used to transmit in the back-to-back (BTB) link. If the $S_{ref}$ and $R_{ref}$ denote the transmitted and received BPSK signal in frequency domain, respectively, the linear TF $h_{TF}$ is given by $$h_{TF}=S_{ref}/R_{ref} \quad (1)$$

If the transmitted signal S (e.g., 2-level for QPSK) is inverted by multiplying $h_{TF}$ $$S_{pre-eq.}=S*h_{TF} \quad (2)$$

The impairment of channel inter-symbol interference (ISI) caused by aggressive pre-filtering can be effectively pre-compensated.

Figure 1B:
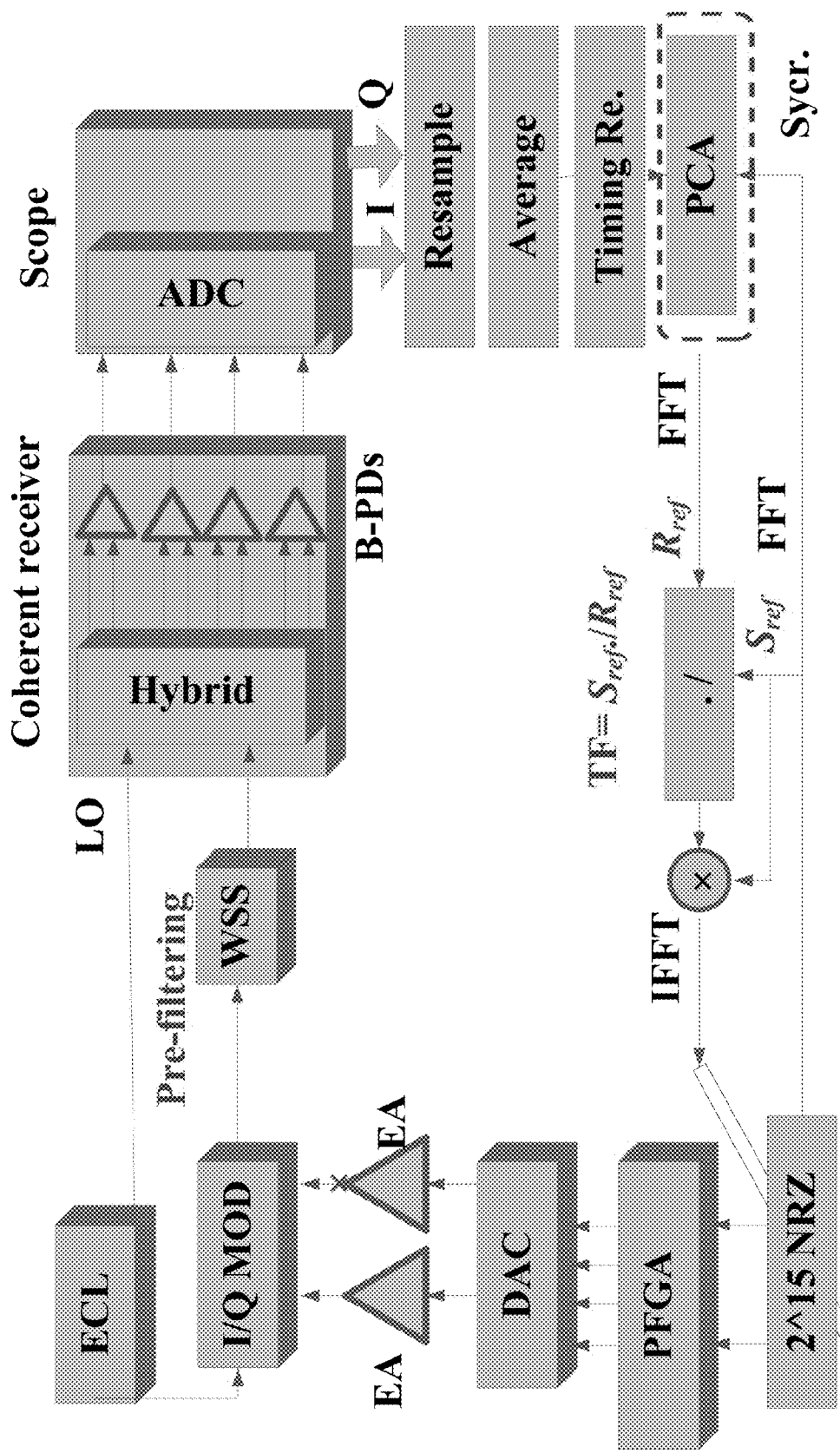
FIG. 1B is a block diagram representation of a pre-equalization scheme at the transmitter by using optical binary phase shift keying (BPSK) reference, in which ECL is an external cavity laser, EA is an electrical amplifier, and B-PDs are balance phase detectors.

FIG. 1B shows an embodiment of a pre-equalization scheme. At the transmitter, a pseudo-random binary sequence (PRBS) signal with a length of $2^{15}$ is generated via a digital to analog converter (DAC) through field-programmable gate array (FPGA). The laser source is an external cavity laser (ECL) with a linewidth around 100 kHz. It is used as both the signal source and the local oscillator (LO) in a self-homodyne coherent detection setup, which is for the purpose of avoiding carrier offset in detection. Two parallel Mach-Zehnder modulators (MZMs) of I/Q modulator (I/Q MOD) are both biased at the null point and driven at full swing to achieve zero-chirp 0- and π-phase modulation. Only one of the parallel MZMs is driven by the binary signal after power boosting by an electrical amplifier (EA) to obtain the optical BPSK signal.

By passing through a programmable wavelength selective switch (WSS) with the passband less than or equal to the signal bandwidth, the optical BPSK signal is detected by the homodyne coherent receiver. A 90° optical hybrid is used to realize polarization and phase-diverse coherent detection. A digital oscilloscope (OSC) is employed for analog-to-digital conversion (ADC) and the captured data is processed by off-line DSP. After re-sampling, 20 sets of modulus of the received BPSK are averaged to obtain the sampling phase for timing recovery. Then the time domain synchronization through sample correlation is performed between the recovered pattern and the transmitted pattern from DAC.

Assuming that a(t) represents the transmitted pattern of the BPSK signal, the recovered pattern by self-homodyne is given by $$r(t)=a(t)*e^{j\phi(t)}+n(t) \quad (3)$$

Where φ(t) is the phase noise, n(t) represents the channel noise.

$$\phi(t)=a(t)./r(t)=e^{-j\phi(t)}+n(t) \quad (4)$$

Both a(t) and φ(t) are sampled at the symbol rate, and perfect clock recovery and correlation have obtained.

Figure 2:
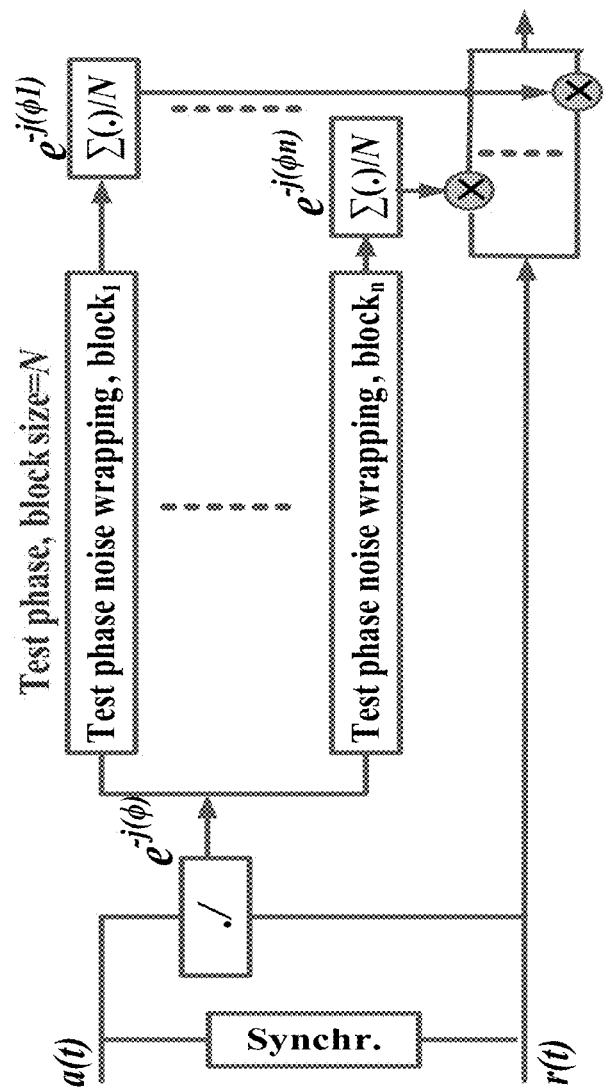
FIG. 2 depicts an example implementation of a phase correction algorithm based on reference-based phase noise averaging. The abbreviation Synchr represents synchronization.

FIG. 2 depicts an example structure of the phase correction algorithm based on reference-based phase noise averaging. To minimize the phase noise in a test phase noise wrapping, parallel processing of consecutive samples is averaged in the block distances of N. The optimum value of block distance depends on the product of laser linewidth and symbol rate. For example, for less accurate lasers (i.e., larger linewidth values) a larger N may be selected. Similarly, for higher symbol rate with shorter symbol period, a smaller N may be used to average over a number of symbols representing a greater time period. After multiplying the optimum averaged phase angle by (4), the recovered binary signal is used for the TF calculation. The TF is obtained from the corresponding quotient product (./ operator) of fast Fourier transform (FFT) of both recovered binary and transmitted data in frequency domain. Then FFT of the transmitted pattern is used to multiply with the TF to realize the pre-equalization.

Figure 3:
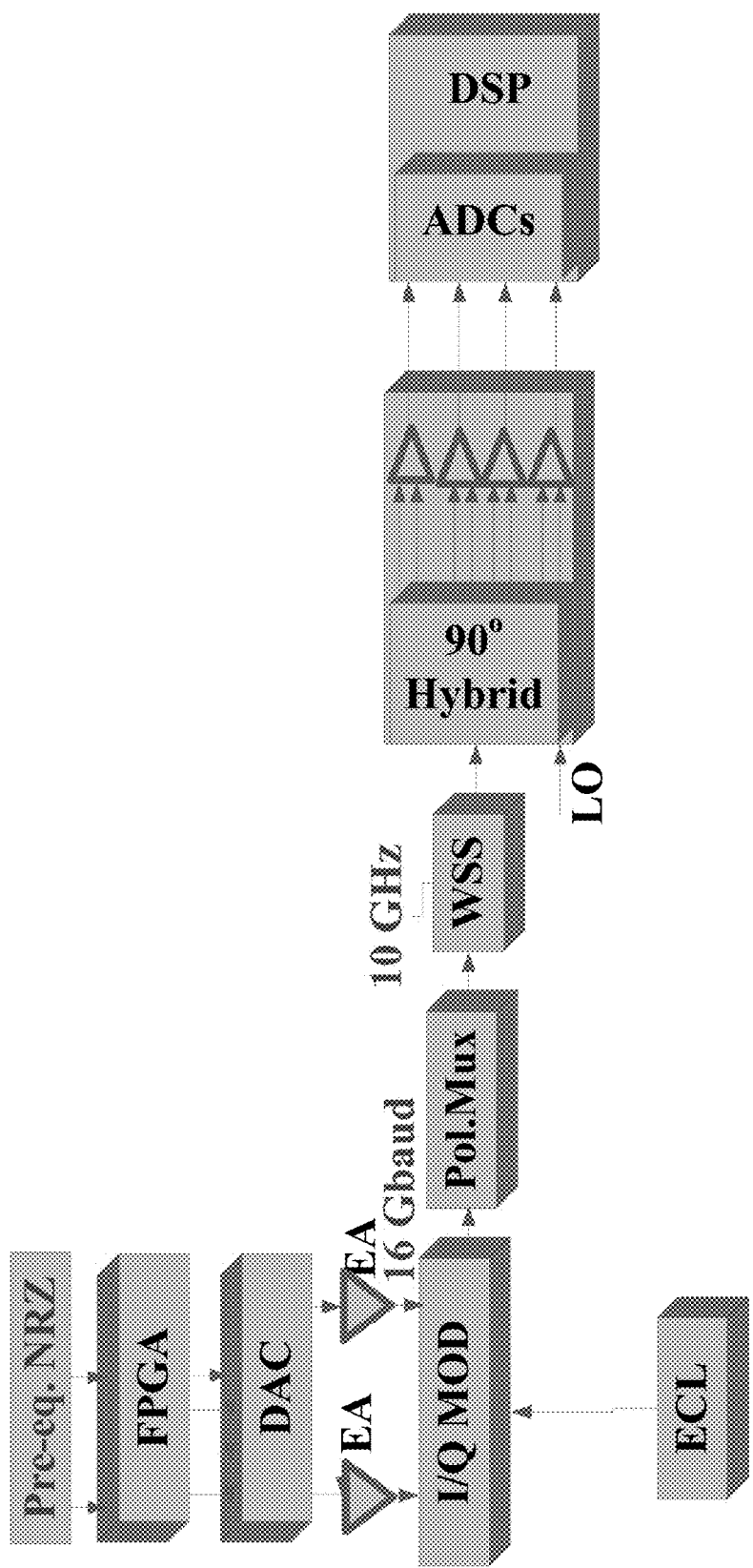
FIG. 3 depicts an experimental setup for the pre-equalized 16-Gbaud PDM-QPSK with 10-GHz pre-filtering.

FIG. 3 illustrates the experiment setup for the 16-Gbaud PDM-QPSK (polarization division multiplexed quadrature phase shift keying) signal with 10-GHz pre-filtering using an embodiment of the disclosed pre-equalization technique. The TF is obtained by using a 16-Gbaud BPSK reference signal. It is noted that the pre-equalization for the in-phase (I) and quadrature (Q) outputs of DAC shows similar performance.

Therefore the same estimated TF can be used for both I and Q components of the QPSK signal. The DAC operates at 32 GSa/s with two samples per symbol. The pre-filtering effect is emulated by a WSS with a bandwidth of 10 GHz, which has a measured 3-dB passing bandwidth of 8.2 GHz. The polarization multiplexing is realized via a multiplexer (Pol. Mux), comprising a PM-OC to halve the signal, the optical delay line to provide a 150-symbol delay, and a polarization beam combiner (PBC) to recombine the signal. For the DSP, the polarization de-multiplexing is realized by two FIR filters based on constant modulus algorithm (CMA). The 4-th power is used to estimate the frequency offset between the LO and the received optical signal. The phase recovery is obtained from the speed of the phase rotation of the M-th power of the signal.

Figure 4:
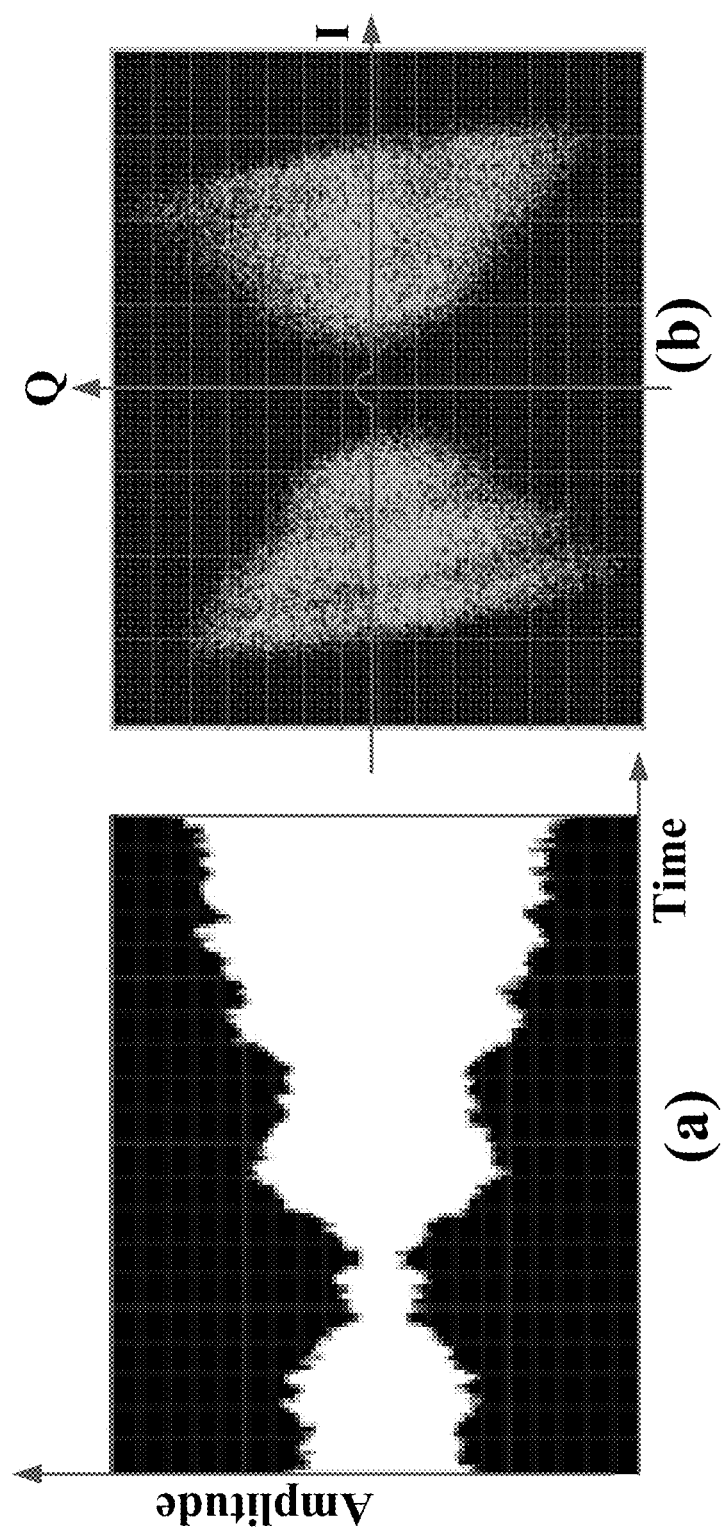
FIG. 4 (a) depicts an example of a time domain electrical signal of the BPSK reference signal (in-phase), (b) depicts corresponding constellation of the BPSK signal. Linewidth of the ECL: 100 kHz.

FIG. 4(a) depicts the I component of the BPSK reference signal in time domain by self-homodyne detection. The power of the signal is inconsecutive due to the phase noise by the laser (ECL) with 100-kHz linewidth.

FIG. 4(b) shows the corresponding constellation. It can be seen that the phase noise causes significant phase offset, represented by the constellation clouds on the left and on the right.

Figure 5:
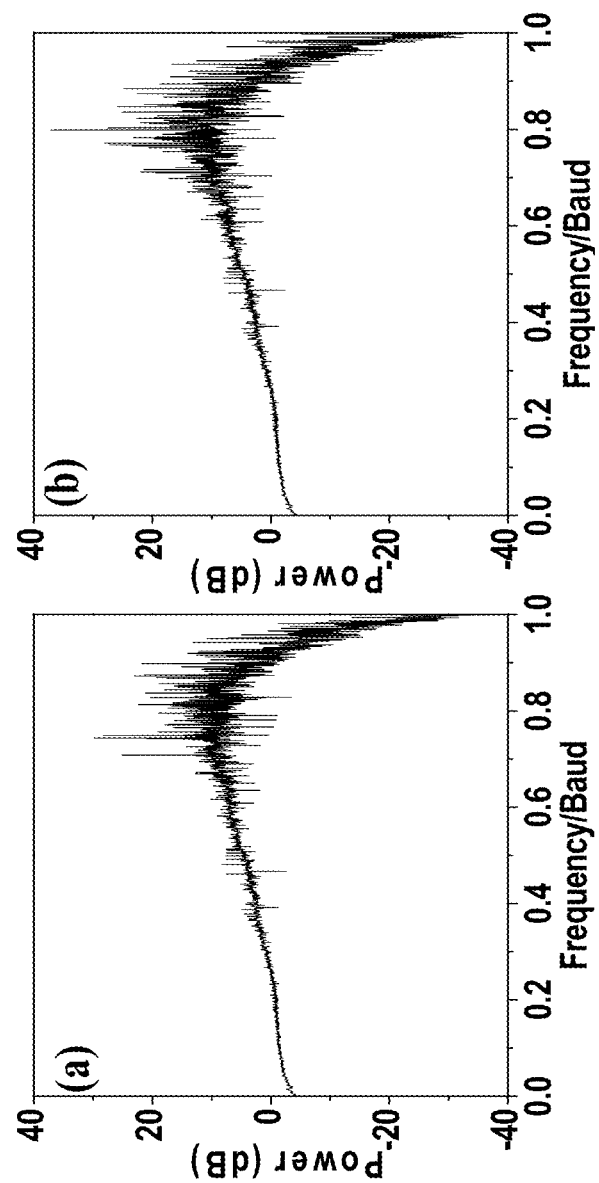
FIG. 5 is a graph depicting an example transfer function calculated using 16 Gbaud BPSK reference signal, (a) without phase correction algorithm (PCA), (b) with phase correction.

FIG. 5 depicts the obtained TF by reference-based pre-equalization scheme without (a) and with (b) PCA. Both cases show the pre-emphasized high-frequency components because this component undergoes aggressive suppression by spectral pre-filtering. The resolution of the TF with PCA (FIG. 5b) shows a higher resolution than the one without PCA at a 0.7~1 frequency/baud ratio.

Figure 6:
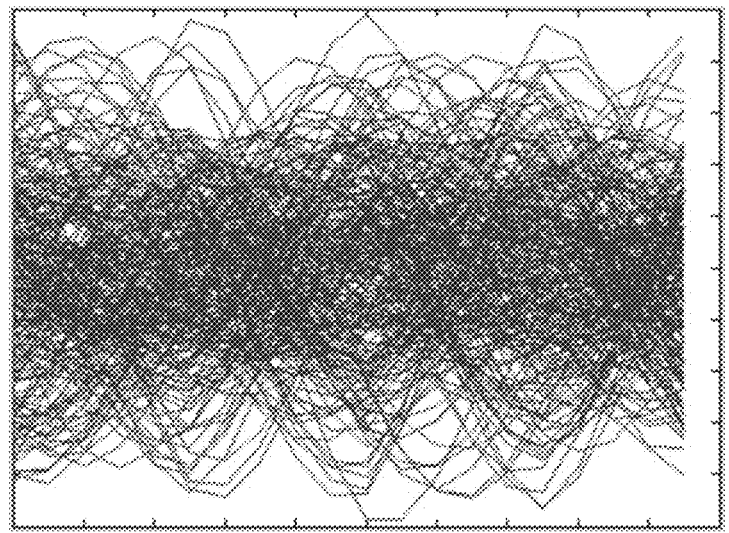
FIG. 6 depicts eye diagram of the pre-equalized BPSK reference signal by DSP, (a) without PCA, (b) with PCA.
Figure 6:
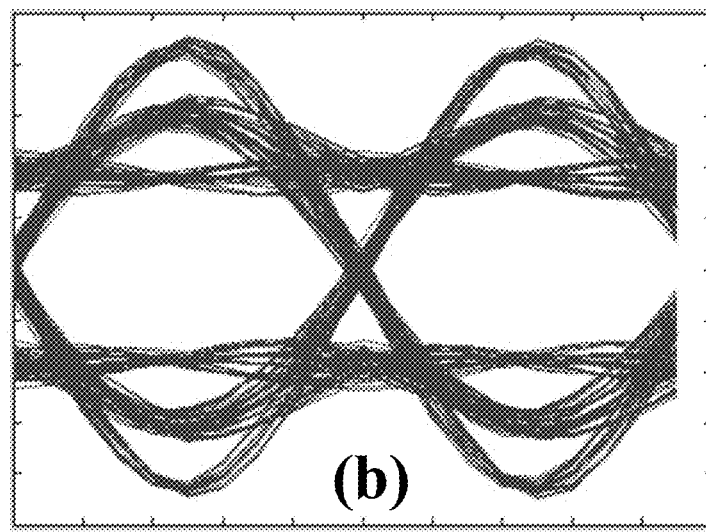

The corresponding eye diagram examples of 16-Gbaud BPSK reference signals by pre-equalization without (a) and with (b) PCA are shown in FIG. 6. FIG. 6(a) shows that the pre-equalization fails to be implemented accurately with the absence of PCA. FIG. 6(b) shows effective compensation with some distortion due to the emphasized high-frequency components, resulting in an open eye diagram.

Figure 7:
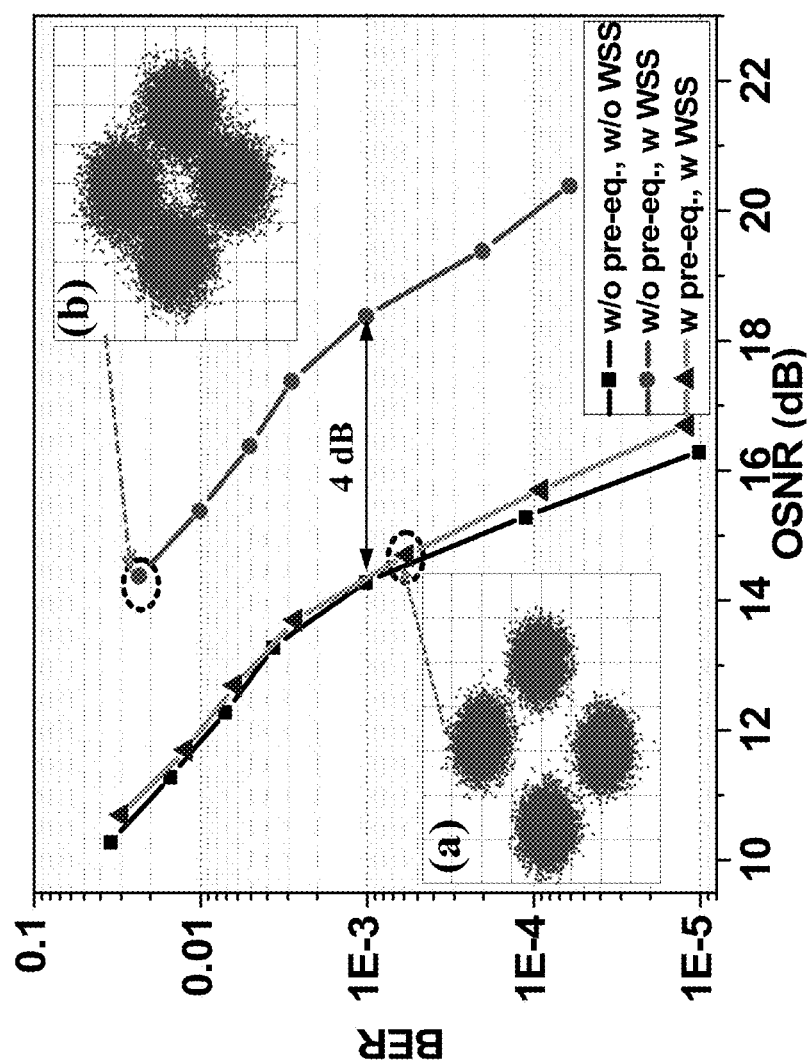
FIG. 7 is a graphical representation of bit error rate (BER) performance for the 16-Gbaud PDM-QPSK passing through 10-GHz WSS, constellations (OSNR=14.3 dB) (a) with pre-equalization, (b) without pre-equalization.

Measured bit error rate (BER) performance (vertical axis) for the 16-Gbaud PDM-QPSK signal is shown in FIG. 7, as a function of the optical signal-to-noise ratio (OSNR) along the horizontal axis. Without the implementation of pre-compensation, the required OSNR is 18.3 dB to achieve a BER of $10^{-3}$. Pre-compensation improves the performance by reducing the required OSNR (ROSNR) to 14.3 dB for the aggressive 10-GHz pre-filtering. The ROSNR improvement by pre-equalization is about 4 dB. We also measured the PDM-QPSK signal without pre-equalization and the WSS. The OSNR penalty caused by the aggressive pre-filtering can be neglected by the implementation of the proposed pre-equalization, which means that the ISI caused by the 10-GHz WSS can be accurately compensated.

FIGS. 7(a) and (b) shows the retrieved constellations of the 16-Gbaud PDM-QPSK signal at the OSNR of 14.3 dB with and without pre-equalization, respectively. The much clearer constellation as inset FIG. 7(a) (OSNR=14.3 dB) indicates the effectiveness of the disclosed pre-equalization scheme.

Figure 8:
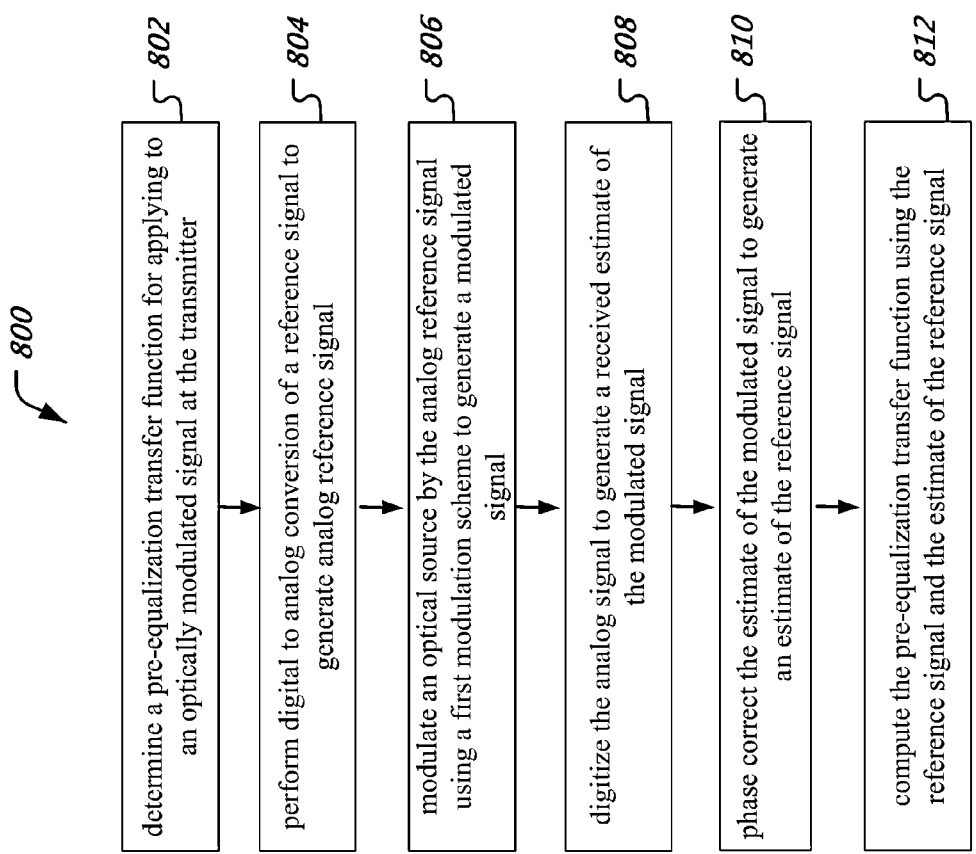
FIG. 8 is a flowchart representation of a process of optical signal processing in an optical transmitter.

FIG. 8 is a flowchart representation of a process 800 for use at a transmitter-side in an optical communication network. The process 800 may be used to improve robustness of transmitter performance to the linewidth of the optical laser source. For example, as previously described, the use of process 800 at the transmitter-side may improve end-to-end communication system performance by 4 dB OSNR.

At 802, the process 800 determines a pre-equalization transfer function for applying to an optically modulated signal. Examples of the pre-equalization transfer function are depicted in FIG. 5b.

At 804, the process 800 performs digital to analog conversion of a reference signal to generate analog reference signal. In some embodiments, the reference signal is known a priori. For example, the use of a PRBS signal of length $2^{15}$ samples was discussed previously. However, depending on the accuracy desired, a longer sample set may be used.

At 806, the process 800 modulating an optical source by the analog reference signal using a first modulation scheme (an I/Q modulator) to generate a modulated signal. As previously described with respect to FIG. 1b and FIG. 3, the reference signal is processed through the same transmit chain that the data signals go through, including the same optical source, DAC and I/Q modulators. For simplicity of implementation, the use of BPSK modulation of the reference signal was previously disclosed. However, other modulations schemes are possible. In some embodiments, the same modulation scheme that will be used for data modulation during data transmission stage may be used for reference signal modulation during the determination of the pre-equalization transfer function.

At 808, the process 800 digitizes the analog signal to generate a received estimate of the modulated signal. As previously disclosed, a homodyne coherent receiver may be used to receive the modulated signal. In addition, polarization of the optical signal may be detected using a 90° optical hybrid. For receiver processing, timing may be recovered by averaging a number of samples of the received signal (e.g., 20 samples).

At 810, the process 800 phase corrects the estimate of the modulated signal to generate an estimate of the reference signal. In some embodiments, the phase correction may be performed by processing N number of consecutive phase sample values. As previously disclosed, the number N may depend on operational parameters such as symbol rate and linewidth of the laser source. In some embodiments, N consecutive samples may be non-overlapping (e.g., FIG. 2). In some embodiments, a sliding window technique in which the window slides less than N samples and has a length of N samples may be used for averaging. Other lowpass filtering techniques instead of simple averaging may be used based on knowledge of the expected spectrum of phase noise randomness.

At 812, the process 800 computes the pre-equalization transfer function using the reference signal and the estimate of the reference signal. The process 800 may perform the calculations using techniques disclosed with respect to Equations (1) to (4).

Figure 9:
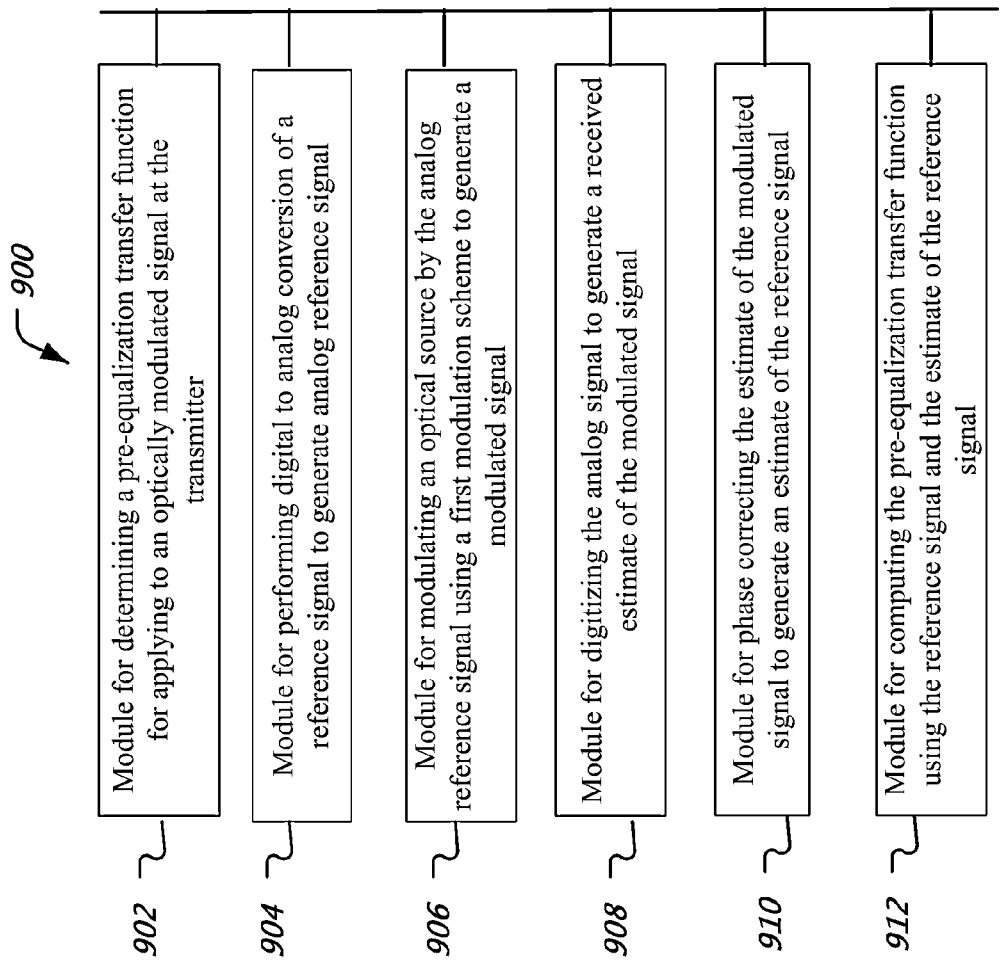
FIG. 9 is a block diagram representation of an optical transmitter.

FIG. 9 is a block diagram representation of an optical transmitter 900. The module 902 is for determining a pre-equalization transfer function applied to an optically modulated signal at the transmitter. The module 904 is for performing digital to analog conversion of a reference signal to generate analog reference signal. The module 906 is for modulating an optical source by the analog reference signal using a first modulation scheme to generate a modulated signal. The module 908 is for digitizing the analog signal to generate a received estimate of the modulated signal. The module 910 phase corrects the estimate of the modulated signal to generate an estimate of the reference signal. The module 912 estimates the pre-equalization transfer function using the reference signal and the estimate of the reference signal. The apparatus 900 and modules 902, 904, 906, 908, 910 and 912 can be further configured to implement one or more functionalities described in this document.

Additional features and embodiments are discussed in Appendix A, which forms an integral part of the present patent document and is incorporated herein by reference in its entirety.

It will be appreciated that a phase correction algorithm employing reference-based phase noise averaging to reduce the impairment caused by phase noise, which improves tolerance of laser linewidth for digital pre-equalization of aggressive optical filtering effect has been disclosed. Experimental results are also provided establishing that, in one advantageous aspect of the disclosed technology, the laser linewidth is relaxed from 400 Hz to 100 kHz. The benefit of a 4-dB ROSNR reduction is also demonstrated for the 16-Gbaud PDM-QPSK in a 10-GHz WDM grid.

The disclosed and other embodiments, modules and the functional operations described in this document can be implemented in digital electronic circuitry, or in computer software, firmware, or hardware, including the structures disclosed in this document and their structural equivalents, or in combinations of one or more of them. The disclosed and other embodiments can be implemented as one or more computer program products, i.e., one or more modules of computer program instructions encoded on a computer readable medium for execution by, or to control the operation of, data processing apparatus. The computer readable medium can be a machine-readable storage device, a machine-readable storage substrate, a memory device, a composition of matter effecting a machine-readable propagated signal, or a combination of one or more them. The term "data processing apparatus" encompasses all apparatus, devices, and machines for processing data, including by way of example a programmable processor, a computer, or multiple processors or computers. The apparatus can include, in addition to hardware, code that creates an execution environment for the computer program in question, e.g., code that constitutes processor firmware, a protocol stack, a database management system, an operating system, or a combination of one or more of them. A propagated signal is an artificially generated signal, e.g., a machine-generated electrical, optical, or electromagnetic signal, that is generated to encode information for transmission to suitable receiver apparatus.

A computer program (also known as a program, software, software application, script, or code) can be written in any form of programming language, including compiled or interpreted languages, and it can be deployed in any form, including as a stand alone program or as a module, component, subroutine, or other unit suitable for use in a computing environment. A computer program does not necessarily correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program can be deployed to be executed on one computer or on multiple computers that are located at one site or distributed across multiple sites and interconnected by a communication network.

The processes and logic flows described in this document can be performed by one or more programmable processors executing one or more computer programs to perform functions by operating on input data and generating output. The processes and logic flows can also be performed by, and apparatus can also be implemented as, special purpose logic circuitry, e.g., an FPGA (field programmable gate array) or an ASIC (application specific integrated circuit).

Processors suitable for the execution of a computer program include, by way of example, both general and special purpose microprocessors, and any one or more processors of any kind of digital computer. Generally, a processor will receive instructions and data from a read only memory or a random access memory or both. The essential elements of a computer are a processor for performing instructions and one or more memory devices for storing instructions and data. Generally, a computer will also include, or be operatively coupled to receive data from or transfer data to, or both, one or more mass storage devices for storing data, e.g., magnetic, magneto optical disks, or optical disks. However, a computer need not have such devices. Computer readable media suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto optical disks; and CD ROM and DVD-ROM disks. The processor and the memory can be supplemented by, or incorporated in, special purpose logic circuitry.

While this patent document contains many specifics, these should not be construed as limitations on the scope of an invention that is claimed or of what may be claimed, but rather as descriptions of features specific to particular embodiments. Certain features that are described in this document in the context of separate embodiments can also be implemented in combination in a single embodiment. Conversely, various features that are described in the context of a single embodiment can also be implemented in multiple embodiments separately or in any suitable sub-combination. Moreover, although features may be described above as acting in certain combinations and even initially claimed as such, one or more features from a claimed combination can in some cases be excised from the combination, and the claimed combination may be directed to a sub-combination or a variation of a sub-combination. Similarly, while operations are depicted in the drawings in a particular order, this should not be understood as requiring that such operations be performed in the particular order shown or in sequential order, or that all illustrated operations be performed, to achieve desirable results.

Only a few examples and implementations are disclosed. Variations, modifications, and enhancements to the described examples and implementations and other implementations can be made based on what is disclosed.

What is claimed is what is described and illustrated, including:

1. A method for use at a transmitter-side in an optical communication network, comprising:
   determining a pre-equalization transfer function for applying to an optically modulated signal at the transmitter by:
   performing digital to analog conversion of a reference signal to generate an analog reference signal;
   modulating an optical source by the analog reference signal using a first modulation scheme to generate a modulated signal;
   digitizing the modulated signal to generate a received estimate of the modulated signal;
   phase correcting the estimate of the modulated signal to generate an estimate of the reference signal; and
   computing the pre-equalization transfer function using the reference signal and the estimate of the reference signal, wherein the estimate of the reference signal is based on a phase corrected estimate of the modulated signal, wherein the phase corrected estimate includes averaging over a sliding window of length N samples and wherein the sliding window slides less than N samples, where N is a whole number representing a filter block size.

2. The method of claim 1, further comprising:
   transmitting, using a second modulation scheme, data upon applying the pre-equalization transfer function to the data.

3. The method of claim 1, wherein the phase correcting comprises:
   filtering phase values of N consecutive samples of the estimate of the modulated signal, where N is a whole number representing a filter block size.

4. The method of claim 3, wherein the filtering comprises averaging the N consecutive samples.

5. The method of claim 4, wherein averaging the N consecutive samples includes parallel processing over a number of blocks, each having a size N.

6. The method of claim 3, wherein N is selected based on a product of a linewidth of the optical source and a symbol rate of the modulated signal.

7. An optical communication transmitter apparatus comprising:
   a memory for storing instructions; and
   a processor that reads the instructions and implements an optical communication method, comprising:

determining a pre-equalization transfer function for applying to an optically modulated signal at the transmitter by:
  performing digital to analog conversion of a reference signal to generate an analog reference signal;
  modulating an optical source by the analog reference signal using a first modulation scheme to generate a modulated signal;
  digitizing the modulated signal to generate a received estimate of the modulated signal;
  phase correcting the estimate of the modulated signal to generate an estimate of the reference signal; and
  computing the pre-equalization transfer function using the reference signal and the estimate of the reference signal, wherein the estimate of the reference signal is based on a phase corrected estimate of the modulated signal, wherein the phase corrected estimate includes averaging over a sliding window of length N samples and wherein the sliding window slides less than N samples, where N is a whole number representing a filter block size.

8. The apparatus of claim 7, wherein the method further comprises:
  transmitting, using a second modulation scheme, data upon applying the pre-equalization transfer function to the data.

9. The apparatus of claim 7, wherein the phase correcting comprises:
  filtering phase values of N consecutive samples of the estimate of the modulated signal, where N is a whole number representing a filter block size.

10. The apparatus of claim 9, wherein the filtering comprises averaging the N consecutive samples.

11. The apparatus of claim 9, wherein N is selected based on a product of a linewidth of the optical source and a symbol rate of the modulated signal.

12. An optical transmitter apparatus, comprising:
  a transfer function determination module that determines a pre-equalization transfer function for applying to an optically modulated signal at the transmitter;
  a digital to analog conversion module that performs digital to analog conversion of a reference signal to generate an analog reference signal;
  a reference signal modulation module that modulates an optical source by the analog reference signal using a first modulation scheme to generate a modulated signal;
  an analog to digital conversion module that digitizes the modulated signal to generate a received estimate of the modulated signal;
  a phase correction module that phase corrects the estimate of the modulated signal to generate an estimate of the reference signal; and
  a transfer function estimation module that estimates the pre-equalization transfer function using the reference signal and the estimate of the reference, wherein the estimate of the reference signal is based on a phase corrected estimate of the modulated signal, wherein the phase corrected estimate includes averaging over a sliding window of length N samples and wherein the sliding window slides less than N samples, where N is a whole number representing a filter block size.

13. The apparatus of claim 12, further comprising:
  a transmission module that transmits, using a second modulation scheme, data upon applying the pre-equalization transfer function to the data.

14. The apparatus of claim 12, wherein the phase correction module comprises:
  a filtering module that filters phase values of N consecutive samples of the estimate of the modulated signal, where N is a whole number representing a filter block size.

15. The apparatus of claim 14, wherein the filtering module comprises an averaging module that averages the N consecutive samples.

16. The apparatus of claim 14, further comprising a selection module that selects N based on a product of a linewidth of the optical source and a symbol rate of the modulated signal.

* * * * *